(12) United States Patent
Lee et al.

(10) Patent No.: US 8,774,058 B2
(45) Date of Patent: Jul. 8, 2014

(54) NETWORK SYSTEM AND METHOD FOR DETERMINING NETWORK PATH

(75) Inventors: Soo Gang Lee, Anyang-si (KR); Dong Kyu Park, Gunpo-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 50 days.

(21) Appl. No.: 13/615,618

(22) Filed: Sep. 14, 2012

(65) Prior Publication Data

US 2013/0070773 A1 Mar. 21, 2013

(30) Foreign Application Priority Data

Sep. 21, 2011 (KR) ........................ 10-2011-0095326

(51) Int. Cl.
*H04L 12/28* (2006.01)
*H04L 12/56* (2006.01)
*H04L 12/46* (2006.01)

(52) U.S. Cl.
CPC .................................. *H04L 12/4637* (2013.01)
USPC .......................................... 370/258; 370/400

(58) Field of Classification Search
None
See application file for complete search history.

(56) References Cited

U.S. PATENT DOCUMENTS

| | | | | | |
|---|---|---|---|---|---|
| 5,651,003 | A | * | 7/1997 | Pearce et al. ............. | 370/395.71 |
| 6,888,802 | B1 | * | 5/2005 | Golikeri et al. ............... | 370/254 |
| 7,336,622 | B1 | * | 2/2008 | Fallis et al. ................... | 370/252 |
| 7,602,705 | B1 | * | 10/2009 | Sivasankaran et al. ....... | 370/218 |
| 7,983,152 | B1 | * | 7/2011 | Sivasankaran et al. ....... | 370/218 |
| 2003/0055929 | A1 | * | 3/2003 | Ding et al. .................... | 709/223 |
| 2003/0067926 | A1 | * | 4/2003 | Golikeri et al. ............... | 370/401 |
| 2003/0154285 | A1 | * | 8/2003 | Berglund et al. ............. | 709/227 |
| 2003/0169734 | A1 | * | 9/2003 | Lu et al. ........................ | 370/386 |
| 2005/0169194 | A1 | * | 8/2005 | Golikeri et al. ............... | 370/254 |
| 2005/0190754 | A1 | * | 9/2005 | Golikeri et al. ............... | 370/383 |
| 2005/0265358 | A1 | * | 12/2005 | Mishra et al. ................. | 370/400 |
| 2005/0271044 | A1 | * | 12/2005 | Hsu et al. ....................... | 370/360 |
| 2006/0092832 | A1 | * | 5/2006 | Santoso et al. ................ | 370/218 |
| 2006/0092849 | A1 | * | 5/2006 | Santoso et al. ................ | 370/244 |
| 2006/0092853 | A1 | * | 5/2006 | Santoso et al. ................ | 370/252 |
| 2006/0146697 | A1 | * | 7/2006 | Magret et al. ................. | 370/219 |
| 2006/0146823 | A1 | * | 7/2006 | Ding ............................. | 370/390 |
| 2007/0014234 | A1 | * | 1/2007 | Santoso et al. ................ | 370/216 |
| 2007/0081463 | A1 | * | 4/2007 | Bohra et al. ................... | 370/235 |
| 2008/0137530 | A1 | * | 6/2008 | Fallis et al. .................... | 370/216 |
| 2008/0219238 | A1 | * | 9/2008 | Das ............................... | 370/351 |
| 2010/0265820 | A1 | * | 10/2010 | Feng et al. .................... | 370/228 |

FOREIGN PATENT DOCUMENTS

KR 10-2010-0116578 11/2010

OTHER PUBLICATIONS

Korean Intellectual Property Office Application Serial No. 10-2011-0095326, Office Action dated Sep. 11, 2012, 3 pages.

* cited by examiner

*Primary Examiner* — Suk Jin Kang
(74) *Attorney, Agent, or Firm* — Lee, Hong, Degerman, Kang & Waimey

(57) ABSTRACT

Provided is a network system and a method for determining a network path, the network system including a plurality of extension units, each containing dualized basic units and dualized extension Ethernet modules, a first ring network connected by a first basic unit and a plurality of first extension Ethernet modules, and a second ring network connected by a second basic unit and a plurality of second extension Ethernet modules, wherein the first extension Ethernet module or the second extension Ethernet module transmits or receives data along a network path determined by judging, by the first extension Ethernet module or the second extension Ethernet module, if the first ring network is connected to the second extension Ethernet module using an intrinsic number of each extension Ethernet module.

13 Claims, 7 Drawing Sheets

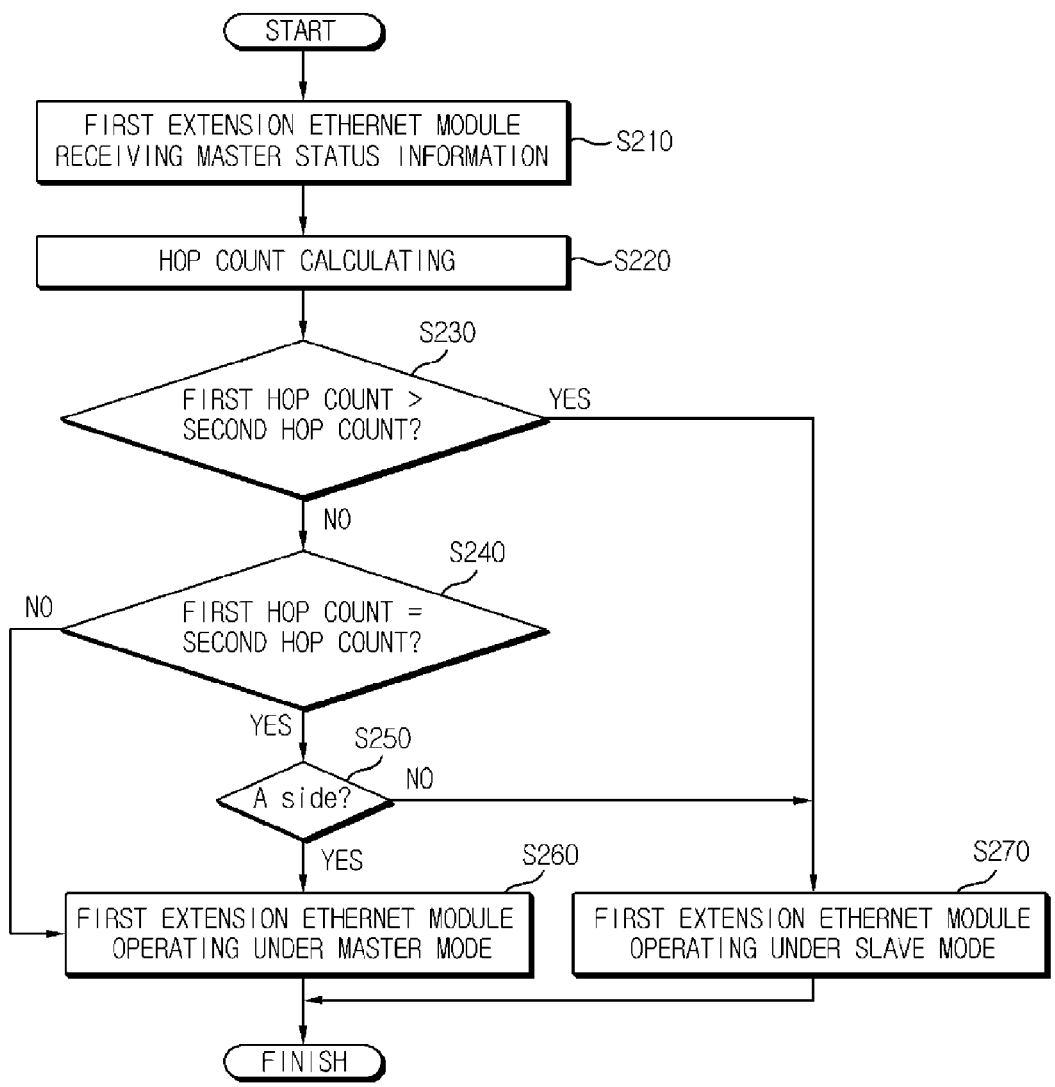

NETWORK SYSTEM AND METHOD FOR DETERMINING NETWORK PATH

Pursuant to 35 U.S.C. §119 (a), this application claims the benefit of earlier filing date and right of priority to Korean Patent Application No. 10-2011-0095326, filed on Sep. 21, 2011, the contents of which is hereby incorporated by reference in their entirety.

BACKGROUND OF THE DISCLOSURE

1. Field of Endeavor

The present disclosure relates to a network system, and more particularly to a network system determining a network path using an intrinsic number of a dual Ethernet module.

2. Background

This section provides background information related to the present disclosure which is not necessarily prior art.

For realization of industrial automation, many companies and factories use network for data communication among elements in an industrial environment. However, a conventional networking protocol used for an office or a home environment is inadequate due to the fact that the industrial environment needs a real time data reception and processing. Thus, a common industrial communication protocol adequate to industrial environments has been developed.

Ethernet communication can solve various disadvantages including high cost, low speed and network connectivity problems with a higher system, and has advantageous capable of performing data transmission/reception with a long distance (several kilometers) extension units. Particularly, a ring-shaped Ethernet (Ethernet is a registered trademark) network can control failures on the network by fast switching using a linear network to increase network availability, thereby attracting attention from industrial fields.

In order to configure a user-desired ring-shaped Ethernet network, each unit must be connected via Ethernet cable included in the network, and a setting process to each unit is needed. Meantime, chances are that each unit contained in the network is dualized, the Ethernet network is configured with one or more rings, or each extension unit is discretely set up several kilometers apart due to Ethernet network characteristics. In this case, there occurs a problem of consuming many hours and efforts in re-setting lots of extension units whose user is situated at a long distance, in a case failure occurs in the Ethernet network. Accordingly, there is room for improvement in the network system.

SUMMARY OF THE DISCLOSURE

This section provides a general summary of the disclosure, and is not a comprehensive disclosure of its full scope or all of its features.

The present disclosure has been made to solve the foregoing disadvantages/problems of the prior art and therefore an object of certain embodiments of the present invention is to provide a PLC network extension system that is free from distance restriction.

Accordingly, embodiments of the present disclosure may relate to a network system that may substantially obviate one or more of the above disadvantages due to limitations and disadvantages of related art, and it is therefore an object of the present disclosure to provide a network system configured to automatically determine and operate a network path using an intrinsic number of each Ethernet module of a network system, in a case an Ethernet cable is connected in a ring network shape desired by a user, and a method for determining a network path.

Technical problems to be solved by the present disclosure are not restricted to the above-mentioned, and any other technical problems not mentioned so far will be clearly appreciated from the following description by skilled in the art.

In one general aspect of the present disclosure, there is provided a network system, the system comprising: a plurality of extension units, each containing a dualized basic unit and a dualized extension Ethernet module; a first ring network connected by a first basic unit and a plurality of first extension Ethernet modules; and a second ring network connected by a second basic unit and a plurality of second extension Ethernet modules, wherein the first extension Ethernet module transmits or receives data along a network path determined by judging, by the first extension Ethernet module, if the first ring network is connected to the second extension Ethernet module using an intrinsic number of each extension Ethernet module.

Preferably, but not necessarily, the first extension Ethernet module determines as a single ring network in which the first ring network and the second ring network are connected, if the first ring network and the second extension Ethernet module are connected.

Preferably, but not necessarily, the first extension Ethernet module determines as a dual (dualized) ring network in which the first ring network and the second ring network are mutually dependent, if the first ring network and the second extension Ethernet module are not connected.

Preferably, but not necessarily, the extension Ethernet module determines whether to operate in a master mode or a slave mode using a hop count.

Preferably, but not necessarily, the hop count is defined by a distance between the extension Ethernet module and the basic unit operating as the master mode.

Preferably, but not necessarily, each of the basic units includes a main Ethernet module further including a data collector collecting data from the extension Ethernet module, an information processor processing the data collected by the data collector and a main master selector determining a basic unit operating in a master mode among the dualized basic units.

Preferably, but not necessarily, each of the extension Ethernet modules includes a network medium unit, a controller controlling modules mounted at the extension unit, and an extension master selector determining a ring network path using an intrinsic number of each extension Ethernet module and operating in master mode among the dualized extension Ethernet modules.

In another general aspect of the present disclosure, there is provided a method for determining a network path in a network system including a plurality of extension units, each containing a dualized basic unit and a dualized extension Ethernet module, a first ring network connected by a first basic unit and a plurality of first extension Ethernet modules, and a second ring network connected by a second basic unit and a plurality of second extension Ethernet modules, the method comprising: (a) receiving, by a first extension Ethernet module, status information from a basic unit of a first ring network; (b) transmitting and receiving data determined by judging, by the first extension Ethernet module, if the first ring network is connected to the second extension Ethernet module, using an intrinsic number of each extension Ethernet module.

Preferably, but not necessarily, the step (b) includes, by the first extension Ethernet module, determining as a single ring network in which the first ring network and the second ring network are connected, if the first ring network and the second extension Ethernet module are connected.

Preferably, but not necessarily, the step (b) includes, by the first extension Ethernet module, determining as a dualized ring network in which the first ring network and the second ring network are mutually dependent, if the first ring network and the second extension Ethernet module are not connected.

Preferably, but not necessarily, the status information is information in which the basic unit operates as a master mode or a slave mode.

Preferably, but not necessarily, the method further includes a step (c) of determining whether the extension Ethernet module operates in a master mode or a slave mode, using a hop count.

Preferably, but not necessarily, the hop count is defined by a distance between the extension Ethernet module and the basic unit operating as the master mode.

Preferably, but not necessarily, each of the basic units includes a main Ethernet module further including a data collector collecting data from the extension Ethernet module, an information processor processing the data collected by the data collector and a main master selector determining a basic unit operating in a master mode among the dualized basic units.

Preferably, but not necessarily, each of the extension Ethernet modules includes a network medium unit, a controller controlling modules mounted at the extension unit, and an extension master selector determining a ring network path using an intrinsic number of each extension Ethernet module and operating in master mode among the dualized extension Ethernet modules.

The network system and a method for determining a network path according to the present disclosure has an advantageous effect in that the Ethernet module can be automatically operated by judging a ring network path, using an intrinsic number provided to each Ethernet module provided to the extension unit (i.e., extension base) by being dualized, whereby, even if the ring network path is changed, a user can effectively manage the extension unit situated at a long distance without a need of being associated with re-set of each extension unit.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which:

FIG. 6 is a flowchart illustrating an operation mode determination of an extension Ethernet module in a network system according to an exemplary embodiment of the present disclosure.

DETAILED DESCRIPTION

Figure 1:
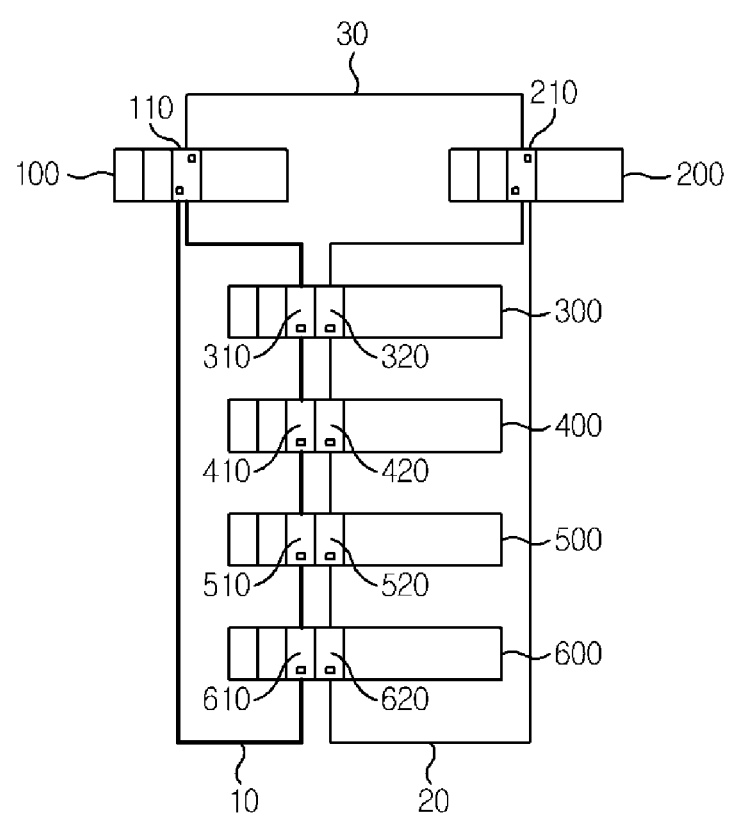
FIG. 1 is a schematic structural view illustrating a dualized ring network according to an exemplary embodiment of the present disclosure.

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

In addition, the terms "-er", "-or", "part" and "module" described in the specification mean units for processing at least one function and operation and can be implemented by hardware components or software components, and combinations thereof.

In the drawings, the size and relative sizes of layers, regions and/or other elements may be exaggerated or reduced for clarity. Like numbers refer to like elements throughout and explanations that duplicate one another will be omitted.

As may be used herein, the terms "substantially" and "approximately" provide an industry-accepted tolerance for its corresponding term and/or relativity between items. As may be used herein, the terms "dual" and "dualized" may be alternatively used as circumstances are changed.

Hereinafter, a network system and a method for determining a network path according to the present disclosure will be described in detail with reference to the accompanying drawings.

Figure 2A:
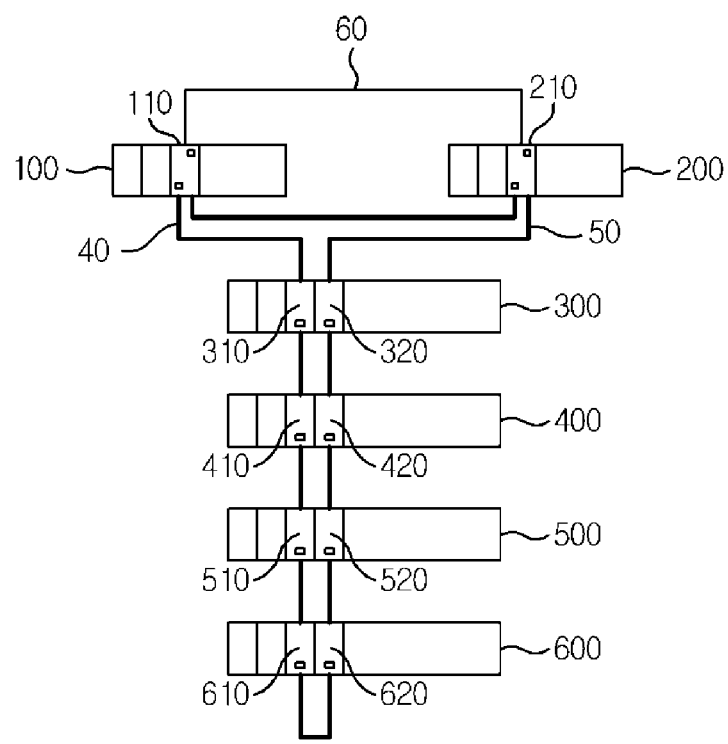
FIGS. 2a and 2b are schematic structural views illustrating a single ring network according to an exemplary embodiment of the present disclosure.
Figure 2B:
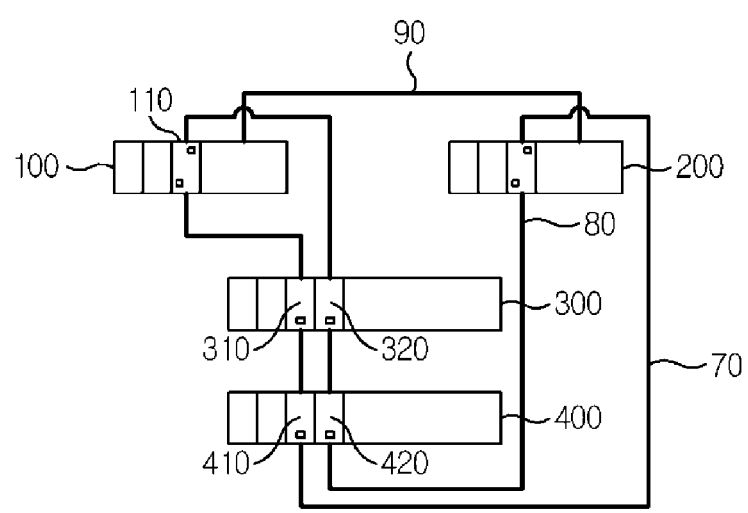

FIG. 1 is a schematic structural view illustrating a dualized ring network according to an exemplary embodiment of the present disclosure, and FIGS. 2a and 2b are schematic structural views illustrating a single ring network according to an exemplary embodiment of the present disclosure.

FIGS. 1, 2a and 2b illustrate a ring network system including dualized main bases (100, 200) as basic units of the network system, and extension bases (300, 400, 500, 600) which are extension units transmitting and receiving data by being connected to the basic units (100, 200) in the shape of a ring. Meanwhile, although FIGS. 1, 2a and 2b illustrate a ring network system including four extension bases, it should be apparent to the skilled in the art that the present disclosure is not limited thereto and the number of extension bases may increase or decrease.

Referring to FIGS. 1, 2a and 2b, each of the main bases (100, 200) includes a CPU (Central Processing Unit) module (not shown) for controlling various modules mounted on the main bases and extension bases, and a power module (not shown) dualized for supplying power into the bases. Furthermore, the main bases (100, 200) formed with a plurality of slots for mounting a variety of modules for performing functions inside the bases include a communication module (not shown) for communicating with the modules mounted on the slots, an I/O (Input/Output) module (not shown) and Ethernet modules (110, 210) for communicating with the extension bases (300, 400, 500, 600).

The CPU module is embedded with a main memory and mounted with an operation system for controlling an entire operation of the network system. The operation system is so programmed as to simultaneously control a variety of modules inside the main bases (100, 200) and a variety of extension bases connected to the main bases (100, 200).

The ring network system is such that the CPU is dualized by being mounted with two main bases (100, 200), such that even if one CPU module is generated with a failure, the system is converted to another CPU module to normally operate without being stopped and to enhance a system availability. Here, the two CPU modules share data through communication routes (30, 60, 90) to enable conversion of CPU modules. Furthermore, each of the main bases (100, 200) dualizes a power module to enable stable power supply.

The extension bases (300, 400, 500, 600) formed with a plurality of slots mountable with modules of various functions include a power module (not shown) for supplying power into the bases, a communication module (not shown) for communicating with modules mounted at the slots, an I/O module (not shown) and an extension module for Ethernet communication with the main bases (100, 200) or other extension bases. Reference numerals 310, 320, 410, 420, 510, 520, 610, 620 in FIGS. 1, 2a and 2b respectively represent the extension Ethernet modules, and it can be noticed that each of the extension bases (300, 400, 500, 600) is formed with dualized extension Ethernet modules.

Main Ethernet modules (10, 210) of main bases (100, 200) and the extension Ethernet modules (310, 320, 410, 420, 510, 520, 610, 620) of extension bases are connected via an Ethernet cables for data exchanging, and reference numerals 10, 20, 40, 50, 70 and 80 in FIGS. 1, 2a and 2b respectively represent the Ethernet cables.

Meanwhile, the network system according to the present disclosure may be realized by a dual (dualized) ring or a single ring network based on Ethernet cable connection method between the main bases (100, 200) and the extension bases (300, 400, 500, 600).

FIG. 1 illustrates a dual ring network in which a first ring network and a second ring network are mutually independently connected, where the first ring network is such that the main Ethernet module (110) of the first main base (100) and the first extension Ethernet modules (310, 410, 510, 610) of each extension base are connected through the Ethernet cable, and the second ring network is such that the main Ethernet module (210) of the second main base (200) and the second extension Ethernet modules (320, 420, 520, 620) of each extension base are connected through the Ethernet cable.

The dual ring network may be advantageously converted to another inactivated ring network, in a case an activated ring network develops a failure, or switches a ring network to a linear network to enhance system availability because data transmission/reception can be performed, in a case where maximum three points on the network are generated with failures. Meanwhile, in a case failure occurs on the extension Ethernet module of the extension base belonging to a ring network operating as a master (i.e., activated), another slave ring network operates as a master to generate conversion of CPU module.

FIGS. 2a and 2b are schematic structural views illustrating a single ring network according to an exemplary embodiment of the present disclosure. In other words, FIGS. 2a and 2b illustrates a dual ring network in which a first ring network and a second ring network are mutually independently connected, where the first ring network is such that the main Ethernet module (110) of the first main base (100) and the first extension Ethernet modules (310, 410, 510, 610) of each extension base are connected through the Ethernet cable, and the second ring network is such that the main Ethernet module (210) of the second main base (200) and the second extension Ethernet modules (320, 420, 520, 620) of each extension base are connected through the Ethernet cable.

Although the single ring network has a less system availability than the dual ring network, in a case the activated network develops a failure, the single ring network has an advantage in that a slave ring network can operate without conversion of CPU even if there is generated a failure on the extension Ethernet module belonging to one ring network operating as a master (i.e., activated).

Figure 3:
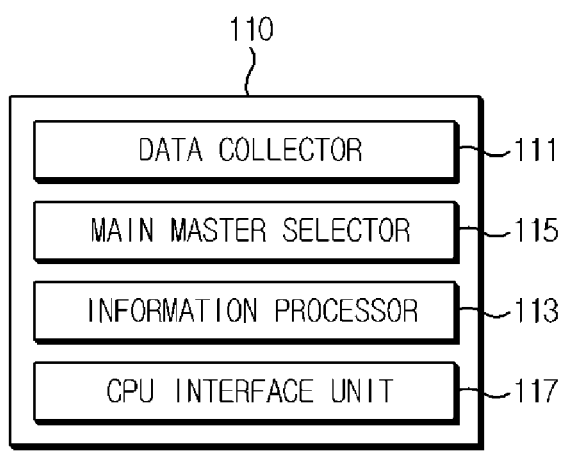
FIGS. 3 and 4 are schematic views illustrating an Ethernet module of a network system according to an exemplary embodiment of the present disclosure.
Figure 4:
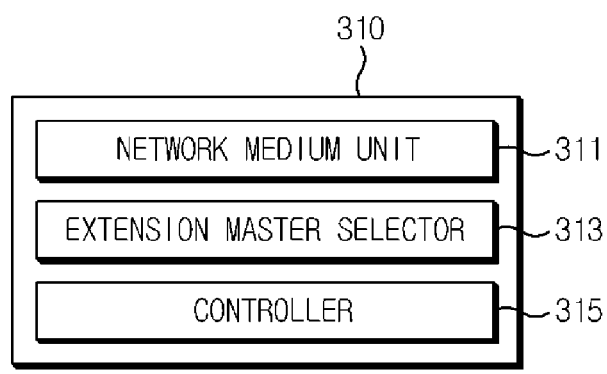

FIGS. 3 and 4 are schematic views illustrating an Ethernet module of a network system according to an exemplary embodiment of the present disclosure, where FIG. 3 is a schematic block diagram of the first main Ethernet module (110) mounted on the first main base, and where the second main Ethernet module (210) mounted on the second main base (200) is substantially same as the first main Ethernet module (110).

Referring to FIG. 3, the first main Ethernet module (110) includes a data collector (111), an information processor (113), a main master selector (115) and a CPU interface unit (117).

The data collector (111) collects data from dualized extension Ethernet modules mounted on a plurality of extension bases. Each of the extension Ethernet modules is formed at one extension base by being dualized, and set with a different intrinsic number. The data collector (111) uses the intrinsic number to collect a relevant extension base and data through mapping.

The information processor (113) receives the data collected from dualized extension Ethernet modules mounted on a plurality of extension bases and integrally processes the data. The main master selector (115) determines which CPU module of CPU modules on the dualized main base (100) is to be operated as a master. The CPU interface unit (117) is a configuration for interface with the CPU modules mounted on the main base (100).

FIG. 4 is a schematic block diagram of the first extension Ethernet module (310) mounted on the extension base (300), where each of the extension Ethernet modules (320, 410, 420, 510, 520, 610, 620) is substantially same as the first main Ethernet module (310).

The first extension Ethernet module (310) includes a network medium unit (311), an extension master selector (313) and a controller (315).

The network medium unit (311) serves to connect the main Ethernet module to the extension Ethernet module through an Ethernet. The extension master selector (313) uses an intrinsic number of each extension Ethernet module to determine a path of the ring network, and to determine which Ethernet module of the dualized extension Ethernet modules is to be operated as a master. The intrinsic number is differently set based on slot number mounted with the extension Ethernet module, such that two extension Ethernet modules mounted on one extension base are differently set in the intrinsic number. Thus, the CPU module on the main base can control each extension Ethernet module without any collision, and the main Ethernet modules can distinguish data which is transmitted to and received from each extension Ethernet module. The controller (315) control the entire module mounted on relevant extension bases.

Now, a method for determining a network path by the extension master selector (313) and a method for determining master/slave modes by the dualized extension base modules will be described in detail with reference to the drawings.

In the following explanation, an example will be provided where a first ring network in which the main Ethernet module (110) of the first main base (100) connected to the first extension Ethernet modules (310, 410, 510, 610) of each extension base via the Ethernet cable operates as a master mode, and a second ring network in which the main Ethernet module (210) of the second main base (200) connected to the second extension Ethernet modules (320, 420, 520, 620) of each extension base via the Ethernet cable operates as a slave mode. Meanwhile, it should be apparent to the skilled in the art that the network path determination process according to the present disclosure will be applied in the same manner as when the first ring network is a slave mode and the second ring network operates as a master mode.

Figure 5:
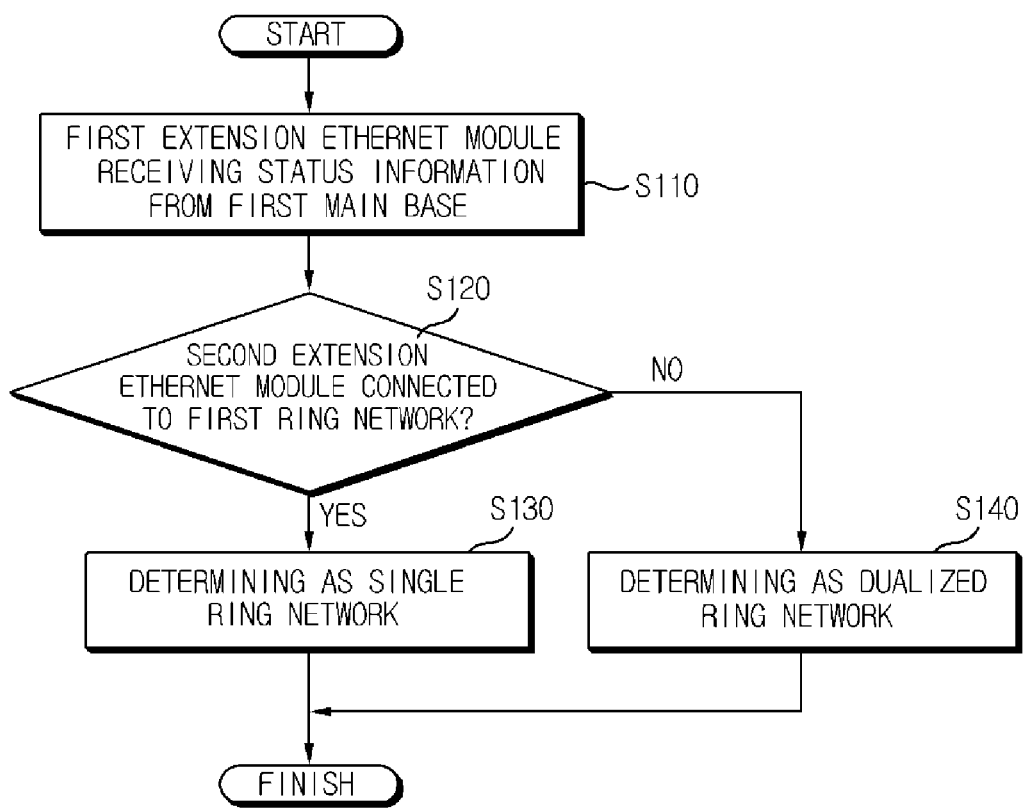
FIG. 5 is a flowchart illustrating a method for determining a network path in a network system according to an exemplary embodiment of the present disclosure.

FIG. 5 is a flowchart illustrating a method for determining a network path in a network system according to an exemplary embodiment of the present disclosure.

Referring to FIG. 5, the first extension Ethernet modules (310, 410, 510, 610) receives status information from the main Ethernet module (110) of the first main base (100) (S110), where the status information represents information as to whether a CPU module of a relevant main base relates to a master mode, or a slave mode. Because the above explanation exemplifies the CPU module of the first main base (100) operates under a master mode, the status information received in the S110 step is master status information.

Meanwhile, each of the extension Ethernet modules continuously receives status information from a CPU module of its own ring network, such that the master status information and the slave status information may be alternatively received as time flows.

The first extension Ethernet modules (310, 410, 510, 610) having received the status information from the main Ethernet module (110) use the intrinsic number to determine whether its own first ring network is connected by the second extension Ethernet module (S120).

As a result of determination at S120, if its own first ring network is connected by the second extension Ethernet module, the first extension Ethernet module determines as a single ring network to operate as such (S130). It is because, as illustrated in FIGS. 2a and 2b, the first ring network and the second ring network are mutually connected to form a single ring in the single ring network, and the first ring network is connected by the second extension Ethernet module.

As a result of determination at S120, if its own first ring network is not connected by the second extension Ethernet module, the first extension Ethernet module determines as a dual ring network to operate as such (S140). It is because, as illustrated in FIG. 1, the first ring network and the second ring network are independently formed in the dualized ring network, and the first ring network is not connected by the second extension Ethernet module.

As noted in the foregoing, another method for determining a network path in a network system according to the present disclosure is such that, only an Ethernet cable is connected in a ring network shape desired by a user, an extension Ethernet module included in the network system automatically determines a single ring or dualized ring network path from a mutual connection relationship between each extension Ethernet module and the main Ethernet module and automatically operates. Thus, there is an advantage in that the user needs not to be involved in an additional network configuration, e.g., re-setting of each extension Ethernet module caused by changes in ring network path, whereby an effective management of each distantly-located extension base can be effected.

FIG. 6 is a flowchart illustrating an operation mode determination of an extension Ethernet module in a network system according to an exemplary embodiment of the present disclosure.

As in FIG. 5, once determination on network path is completed, two extension Ethernet modules mounted on one extension base can perform an additional determination on operation mode.

Now, an extension base referenced as 300 will be exemplified. Any one of the first extension Ethernet module (310) or the second extension Ethernet module (320) of the extension base (300) must operate as a master, while the other must operate as a slave, such that determination on operation mode must be performed.

As a result of determination in FIG. 5, if it is determined that the network path is a dualized ring network, an operation mode is determined in the following process. That is, if the first extension Ethernet module (310) receives master status information, the first ring network is activated to be a master mode, and the first extension Ethernet module (310) operates under a master mode because the second ring network is a slave mode.

Furthermore, if the first extension Ethernet module (310) receives slave status information, the second ring network is activated to be a master mode, and the first extension Ethernet module (310) operates under a slave mode because the first ring network is a slave mode.

Now, a process of determining an operation mode will be explained with reference to FIG. 6, in case of being determined as a single ring network as a result of determination. FIG. 6 exemplifies a case where the first ring network is activated, and it should be apparent to the skilled in the art that an operation mode is determined through a process similar to that of FIG. 6, in a case the second ring network is activated.

Referring to FIG. 6, the first extension Ethernet module (310) receives master status information (S210). That is, this is a case where the first ring network is activated to operate under a master mode, and the CPU module of the first main base (100) becomes a master CPU module. The steps of S220~S270 represent successive steps subsequent to S130 of FIG. 5, such that S210 is substantially same as S110 of FIG. 5.

The first extension Ethernet module (310) counts a hop count (S220). The hop count represents a distance between the extension Ethernet module and the CPU module of master mode. Referring to FIG. 2a, the extension Ethernet module with reference numeral 310 is 1 in terms of hop count, the extension Ethernet module of reference numeral 410 is 2 in terms of hop count.

Successively, comparison is made between the first hop count and the second hop count (S230), where the first hop count represents a hop count between the first extension Ethernet module mounted on each extension base and the master CPU module, and the second hop count represents a hop count between the second extension Ethernet module mounted on each extension base and the master CPU module.

Now, an example of an extension base being a reference numeral of 300 will be explained. The first hop count in a single ring network of FIG. 2a is '1', because it is a distance between the first extension Ethernet module (310) and the first CPU module, and the second hop count is '8', because it is a distance between the second extension Ethernet module (320) and the first CPU module.

As a result of comparison between the first and second hop counts, if it is determined that the first hop count is greater than the second hop count, the first extension Ethernet module (310) operates under the slave mode (S270). As a result of comparison between the first and second hop counts, if it is determined that the first hop count is not greater than the second hop count, flow proceeds to S240.

S240 determines whether the first hop count is equal to the second hop count, and if it is determined that the first hop count is equal to the second hop count, flow proceeds to S250.

FIG. 2b illustrates a case where the first hop count is equal to the second hop count, where the first and second hop counts are all '1'. Therefore, it can be noted, in comparison with FIG. 2a, that even in the same single ring network, the hop count can be differently calculated in response to connection method of Ethernet cable.

In S250, an operation mode is determined based on positions of two extension Ethernet modules mounted on one extension base. That is, referring to FIG. 2b, the extension Ethernet module (310) positioned at left is generally defined as A side, the extension Ethernet module (320) positioned at right is generally defined as B side.

In a case hop counts are same, based on physical positions of extension Ethernet modules, one of A side and B side is given a priority, and FIG. 6 exemplifies a case where A side is given a priority. Thus, the first extension Ethernet module (310) positioned at A side operates under the master mode (S260).

As a result of determination at S260, if it is determined that the first hop count is not same as the second hop count, i.e., the first hop count is smaller than the second hop count, the first extension Ethernet module (310) operates under the master mode (S260). This case conforms to the example of FIG. 2a (i.e., in a case the first ring network is activated).

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A network system, the network system comprising:
   a plurality of extension units, each containing a dualized basic unit and a dualized extension Ethernet module;
   a first ring network connected by a first basic unit and a plurality of first extension Ethernet modules; and
   a second ring network connected by a second basic unit and a plurality of second extension Ethernet modules,
   wherein each of the plurality of first extension Ethernet modules transmits or receives data along a network path determined by judging, by the first extension Ethernet module, if the first ring network is connected to the plurality of second extension Ethernet modules using an intrinsic number of each extension Ethernet module,
   wherein the plurality of first extension Ethernet modules and the plurality of second extension Ethernet modules determine whether to operate as a master mode or a slave mode using a hop count in a single ring network and using status information from the first basic unit and the second basic unit, respectively, in a dual (dualized) ring network.

2. The network system of claim 1, wherein the plurality of first extension Ethernet modules and the plurality of second extension Ethernet modules determine as the single ring network in which the first ring network and the second ring network are connected, if the first ring network and the second extension Ethernet modules are connected.

3. The network system of claim 1, wherein the plurality of first extension Ethernet modules and the plurality of second extension Ethernet modules determine as the dualized ring network in which the first ring network and the second ring network are mutually dependent, if the first ring network and the second extension Ethernet modules are not connected.

4. The network system of claim 1, wherein the hop count is defined by a distance between the extension Ethernet module and the basic unit operating as the master mode.

5. The network system of claim 1,
   wherein each of the basic units includes a main Ethernet module, and
   wherein the main Ethernet module includes a data collector collecting data from the extension Ethernet module, an information processor processing the data collected by the data collector and a main master selector determining a basic unit operating in a master mode among the dualized basic units.

6. The network system of claim 1, wherein each of the extension Ethernet modules includes a network medium unit, a controller controlling module mounted at the extension unit, and an extension master selector determining a ring network path using an intrinsic number of each extension Ethernet module and operating in master mode among the dualized extension Ethernet modules.

7. A method for determining a network path in a network system including a plurality of extension units, each containing a dualized basic unit and a dualized extension Ethernet module, a first ring network connected by a first basic unit and a plurality of first extension Ethernet modules, and a second ring network connected by a second basic unit and a plurality of second extension Ethernet modules, the method comprising:

receiving, by the plurality of first extension Ethernet modules and the plurality of second extension Ethernet modules, status information from the first basic unit and the second basic unit, respectively;

determining whether to operate as a master mode or a slave mode using a hop count in a single ring network and using the status information from the first basic unit and the second basic unit in a dualized ring network; and transmitting and receiving data determined by judging, by the plurality of first extension Ethernet modules, if the first ring network is connected to the second extension Ethernet modules, using an intrinsic number of each extension Ethernet module.

8. The method of claim 7, wherein determining whether to operate as a master mode or a slave mode, includes determining, by the first extension Ethernet modules and the second extension Ethernet modules, as the single ring network in which the first ring network and the second ring network are connected, if the first ring network and the second extension Ethernet modules are connected.

9. The method of claim 7, wherein determining whether to operate as a master mode or a slave mode, includes determining, by the first extension Ethernet modules and the second extension Ethernet modules, as the dualized ring network in which the first ring network and the second ring network are mutually dependent, if the first ring network and the second extension Ethernet modules are not connected.

10. The method of claim 7, wherein the status information is information in which the basic unit operates as a master mode or a slave mode.

11. The method of claim 7, wherein the hop count is defined by a distance between the extension Ethernet module and the basic unit operating as the master mode.

12. The method of claim 7,
wherein each of the basic units includes a main Ethernet module, and
wherein the main Ethernet module includes a data collector collecting data from the extension Ethernet module, an information processor processing the data collected by the data collector and a main master selector determining a basic unit operating in a master mode among the dualized basic units.

13. The method of claim 7, wherein each of the extension Ethernet modules includes a network medium unit, a controller controlling module mounted at the extension unit, and an extension master selector determining a ring network path using an intrinsic number of each extension Ethernet module and operating in master mode among the dualized extension Ethernet modules.

* * * * *